(12) United States Patent
Shimanuki et al.

(10) Patent No.: US 10,637,061 B2
(45) Date of Patent: Apr. 28, 2020

(54) LITHIUM ION SECONDARY BATTERY

(71) Applicant: NEC Corporation, Tokyo (JP)

(72) Inventors: Ikiko Shimanuki, Tokyo (JP); Suguru Tamai, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 49 days.

(21) Appl. No.: 15/577,432

(22) PCT Filed: May 25, 2016

(86) PCT No.: PCT/JP2016/065446
§ 371 (c)(1),
(2) Date: Nov. 28, 2017

(87) PCT Pub. No.: WO2016/194733
PCT Pub. Date: Dec. 8, 2016

(65) Prior Publication Data
US 2018/0151882 A1     May 31, 2018

(30) Foreign Application Priority Data

May 29, 2015 (JP) ................................. 2015-109320
Nov. 30, 2015 (JP) ................................. 2015-233628

(51) Int. Cl.
*H01M 10/0567* (2010.01)
*H01M 4/62* (2006.01)
(Continued)

(52) U.S. Cl.
CPC ........... *H01M 4/622* (2013.01); *H01M 4/133* (2013.01); *H01M 4/134* (2013.01); *H01M 4/48* (2013.01);
(Continued)

(58) Field of Classification Search
None
See application file for complete search history.

(56) References Cited

U.S. PATENT DOCUMENTS

2006/0102474 A1* 5/2006 Sato ..................... H01M 4/13
                                                      204/294
2007/0092796 A1    4/2007 Matsuda et al.
(Continued)

FOREIGN PATENT DOCUMENTS

EP       2913872 A1    9/2015
JP    09-289022 A    11/1997
(Continued)

OTHER PUBLICATIONS

Communication dated Dec. 11, 2018 from the European Patent Office in application No. 16803168.0.
(Continued)

*Primary Examiner* — Wojciech Haske
(74) *Attorney, Agent, or Firm* — Sughrue Mion, PLLC

(57) ABSTRACT

A lithium ion secondary battery excellent in cycle characteristics, comprising a high capacity negative electrode comprising a metal and/or a metal oxide as an active material is provided. The present invention relates to a lithium ion secondary battery comprising a positive electrode, a negative electrode, and an electrolyte solution, wherein the negative electrode comprises (a) a carbon material that can absorb and desorb lithium ions; at least one selected from the group consisting of (b) lithium metal and metals that can be alloyed with lithium and (c) metal oxides that can absorb and desorb lithium ions; and a polyacrylic acid, and the electrolyte solution comprises at least one disulfonic acid ester.

16 Claims, 2 Drawing Sheets

(51) Int. Cl.
    *H01M 4/48*         (2010.01)
    *H01M 4/133*       (2010.01)
    *H01M 4/134*       (2010.01)
    *H01M 4/66*         (2006.01)
    *H01M 10/0525*     (2010.01)
    *H01M 10/058*      (2010.01)

(52) U.S. Cl.
    CPC ........... *H01M 4/625* (2013.01); *H01M 4/661* (2013.01); *H01M 10/058* (2013.01); *H01M 10/0525* (2013.01); *H01M 10/0567* (2013.01); *H01M 2220/20* (2013.01); *Y02E 60/122* (2013.01); *Y02P 70/54* (2015.11); *Y02T 10/7011* (2013.01)

(56) References Cited

U.S. PATENT DOCUMENTS

2013/0280600 A1* 10/2013 Uehara ................ H01M 4/505
                                                        429/200

2013/0323605 A1   12/2013   Yamamoto et al.
2014/0087249 A1    3/2014   Azami

FOREIGN PATENT DOCUMENTS

| | | |
|---|---|---|
| JP | 2004-281368 A | 10/2004 |
| JP | 2006-164952 A | 6/2006 |
| JP | 2008-192488 A | 8/2008 |
| JP | 2011-023221 A | 2/2011 |
| JP | 2011-124039 A | 6/2011 |
| JP | 5192703 B2 | 5/2013 |
| JP | 5574404 B2 | 8/2014 |
| WO | 2012/120597 A1 | 9/2012 |
| WO | 2013/008525 A1 | 1/2013 |

OTHER PUBLICATIONS

International Search Report of PCT/JP2016/065446 dated Jul. 26, 2016.

* cited by examiner

LITHIUM ION SECONDARY BATTERY

CROSS REFERENCE TO RELATED APPLICATIONS

This is a National Stage of International Application No. PCT/JP2016/065446 filed May 25, 2016, claiming priority based on Japanese Patent Application No. 2015-109320 filed May 29, 2015 and Japanese Patent Application No. 2015-233628 filed Nov. 30, 2015, the contents of all of which are incorporated herein by reference in their entirety.

TECHNICAL FIELD

The present invention relates to a lithium ion secondary battery, and more specifically, relates to a lithium ion secondary battery excellent in cycle characteristics having a negative electrode comprising a negative electrode active material comprising a metal and/or a metal oxide and a polyacrylic acid, and a method for manufacturing the same.

BACKGROUND ART

Secondary batteries such as lithium ion secondary batteries have advantages such as high energy density, small self-discharge, excellent long-term reliability and the like, and therefore they have been put into practical use in notebook-type personal computers and mobile phones. More recently, there is a demand for development of high performance secondary batteries improved in capacity and energy density and excellent in battery performance such as cycle characteristics and storage characteristics due to the expansion of market of motor driven vehicles such as electric vehicles and hybrid vehicles and the acceleration of the development of domestic and industrial power storage systems, in addition to the trend of high functionality of electronic equipment.

Various electrolyte solutions comprising an additive are developed in order to improve battery performance, such as cycle characteristics and storage characteristics. As one example, Patent Document 1 discloses an electrolyte solution for secondary batteries comprising an aprotic solvent and a cyclic sulfonic acid ester having at least two sulfonyl groups.

On the other hand, metal type active materials such as alloys of lithium with silicon or tin and metal oxides attract attention as a negative electrode active material providing a high capacity secondary battery. These metal type negative electrode active materials provide high capacity but they have a problem that cycle characteristics decrease because expansion and contraction of the active materials are large when lithium ions are absorbed and desorbed. As a binder used for negative electrodes comprising such metal type active materials showing large expansion and contraction during charge and discharge, it is preferable to select a binder with strong binding force capable of withstanding the volume change of the active material.

For example, Patent Document 2 (Claim 1 and the like) discloses a non-aqueous electrolyte secondary battery comprising a negative electrode comprising a mixture of active material particles in which an periphery of a mixed sintered product of simple silicon and silicon oxide is covered with carbon composed of mixed composition of amorphous carbon and graphite carbon, and a thermosetting resin which undergoes a dehydration condensation reaction by heating, wherein a non-aqueous electrolyte comprises a non-aqueous solvent and at least one selected from methylene methane disulfonate, ethylene methane disulfonate and propylene methane disulfonate. The document discloses that since the thermosetting resin functioning as a binder undergoes a dehydration condensation reaction by heating and shows the effect of strongly binding active material particles, and active materials and a current collector, initial charge/discharge capacity can be improved by improvement of current collecting property due to reduction of contact resistance.

In addition, Patent Document 3 discloses that deterioration of battery properties due to the expansion of the alloy materials can be suppressed by using a negative electrode for non-aqueous electrolyte secondary batteries (Claim 1 and the like) comprising an alloy material and graphite, in which the alloy material comprises the phase A mainly comprising Si and the phase B consisting of intermetallic compound of at least one transition metal element and Si, wherein at least one of the phase A and the phase B consists of an amorphous region or a microcrystal region, the ratio of the phase A is 40% by weight or more and 95% by weight or less of the total weight of the phase A and the phase B, and the ratio of the graphite is 50% by weight or more and 95% by weight or less of the total weight of the alloy materials and the graphite. Patent Document 3 discloses that a polyacrylic acid is used as a negative electrode binder in the secondary battery.

CITATION LIST

Patent Document

Patent Document 1: Japanese Patent Laid-Open No. 2004-281368

Patent Document 2: Japanese Patent No. 5192703

Patent Document 3: Japanese Patent Laid-Open No. 2006-164952

SUMMARY OF INVENTION

Technical Problem

Compared to binders swelling largely such as PVdF, polyacrylic acids are suitable for a binder for negative electrodes comprising the metal type active material since it has high bonding strength and coatability and can follow the volume change of the active materials. On the other hand, since they have a good coating property, there is a problem that the binder itself serves as a resistance, and cycle characteristics are decreased. The present invention has been made to solve such a problem, and aims at providing a lithium ion secondary battery improved in cycle characteristics and having a high capacity negative electrode comprising metal and/or metal oxide.

Solution to Problem

One aspect of the present invention relates to a lithium ion secondary battery comprising a positive electrode, a negative electrode, and an electrolyte solution, wherein the negative electrode comprises (a) a carbon material that can absorb and desorb lithium ions; at least one selected from the group consisting of (b) lithium metal and metals that can be alloyed with lithium and (c) metal oxides that can absorb and desorb lithium ions; and a polyacrylic acid, and the electrolyte solution comprises at least one disulfonic acid ester.

Advantageous Effect of Invention

According to the present invention, a lithium ion secondary battery having a high capacity negative electrode and having improved cycle characteristics can be provided.

DESCRIPTION OF EMBODIMENTS

Figure 1:
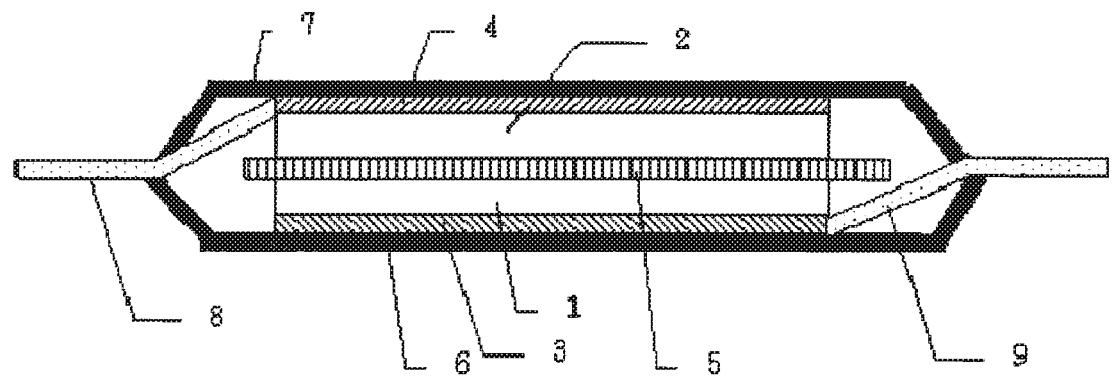
FIG. 1 is a view showing cross-sectional structure of a secondary battery.

The lithium ion secondary battery according to one embodiment of the present invention is characterized in having a negative electrode comprising a negative electrode active material comprising a metal and/or a metal oxide and a binder comprising a polyacrylic acid and comprising an electrolyte solution comprising a disulfonic acid ester. According to the present embodiment, a secondary battery excellent in cycle characteristics can be obtained.

The reason that the lithium ion secondary battery according to the present embodiment is excellent in cycle characteristics is not clear but it is presumed as follows. As described above, polyacrylic acids have high bonding strength and are suitable for a binder for negative electrodes using active materials with large volume change on intercalating/deintercalating lithium ions. On the other hand, since they have a high coating property over active materials, the binder itself serves as a resistance and thereby cycle characteristics of secondary batteries are decreased in some cases. Since a sulfur type additive such as a disulfonic acid ester or the like is added into the electrolyte solution in the lithium ion secondary battery according to the present embodiment, an acidic group on a side chain of the polyacrylic acid used for a binder reacts with the additive to form a low resistance coating onto the negative electrode. As a result, it is presumed that electrons can be transferred smoothly to the negative electrode active material and thereby the cycle characteristics are improved. The above mechanism is reasoning and the present invention is not limited thereto.

Hereinafter, the configuration and the components of the lithium ion secondary battery according to one embodiment of the present invention will be described.
[1] Negative Electrode
The negative electrode may have a structure in which a negative electrode active material layer containing a negative electrode active material and a negative electrode binder is formed on a negative current collector.
(Negative Electrode Active Material)
Examples of the negative electrode active material include (a) carbon materials that can absorb and desorb lithium ions, (b) lithium metal and metals that can be alloyed with lithium, (c) metal oxides that can absorb and desorb lithium ions, and the like.

As (a) the carbon material, graphite absorbing lithium (natural graphite, artificial graphite and the like), amorphous carbon, diamond-like carbon, carbon nanotube, or a composite thereof can be used. Among them, the graphite and the amorphous carbon are preferred. The graphite has high electron conductivity, excellent in adhesiveness with a collector consisting of metals such as copper, and voltage flatness, and contains less impurities because formed at a high processing temperature. Therefore, the graphite is particularly advantageous for improving negative electrode performance and preferred. On the other hand, amorphous carbons having a low crystallinity exhibit relatively small volume expansion, and therefore have effect of highly relaxing the volume expansion of the whole negative electrode, and hardly undergo the degradation due to nonuniformity such as crystal grain boundaries and defects.

Examples of (b) the lithium metal and the metals that can be alloyed with lithium (hereinafter, simply referred to as "metal" in some cases) include Al, Si, Ti, Pb, Sn, In, Bi, Ag, Ba, Ca, Hg, Pd, Pt, Te, Zn, La and a binary alloy or a ternary or higher-order alloy composed of these metals in addition to lithium metal. These metals may be used in combination of two or more. In addition, these metals may contain one or more of nonmetallic elements. Among them, it is preferable to contain Si (silicon), Sn (tin), Ti (titanium) or an alloy thereof, and it is especially preferable to contain Si or an alloy comprising Si. By using Si, Sn, Ti or an alloy thereof, a lithium secondary battery excellent in weight energy density and volume energy density can be provided. As the lithium metal and the lithium alloy, amorphous materials are particularly preferable. This is because amorphous structure causes less degradation resulting from the nonuniformities such as grain boundary and defects. Lithium metal or a lithium alloy can be formed by an appropriate method such as a melt cooling method, a liquid quenching method, an atomizing method, a vacuum vapor deposition method, a sputtering method, a plasma CVD method, a light CVD method, a heat CVD method, or a sol-gel method.

Examples of (c) the metal oxide that can absorb and desorb lithium ions (hereinafter, simply referred to as "metal oxide" in some cases) include silicon oxide, aluminum oxide, tin oxide, indium oxide, zinc oxide, lithium oxide, titanium oxide, and composite products thereof. As the structure, it is preferable that the whole or a part is an amorphous state. This is because the amorphous structure does not lead to the degradation due to the nonuniformities such as grain boundary and defects. It can be confirmed by X-ray diffraction measurement (general XRD measurement) whether the whole or a part of the metal oxide has the amorphous structure. In addition, the metal oxide may contain one, two or more elements selected from nitrogen, boron and sulfur in a concentration of, for example, 0.1 to 5% by mass. Among them, it is preferable to contain silicon oxide ($SiO_x$ ($0<x\leq2$)). This is because silicon oxide is stable and does not cause reaction with other compounds, When the negative electrode active material comprises the metal and the metal oxide, it is preferable that the whole or a part of the metal disperses in the metal oxide. Thereby, the volume change of the whole negative electrode can be more suppressed, and the decomposition of the electrolyte solution can be also suppressed. Incidentally, by using a transmission electron microscope and energy dispersive X-ray spectroscopy in combination, it can be confirmed that the whole or a part of the metal is dispersed in the metal oxide. Specifically, a cross-section of a sample comprising the metal particles is observed, and the oxygen concentration in the metal particles dispersed in the metal oxide is measured, so as to confirm that the metal composing the metal particles is not converted to its oxide. In one embodiment, it is preferable that the metal oxide is an oxide of a metal which composes the metal. For example, the negative electrode active material may comprise Si as the metal and $SiO_x$ ($0<x\leq2$) as the metal oxide, and at least a part of Si may disperse in $SiO_x$ ($0<x\leq2$).

When the negative electrode active material comprises the carbon material and the metal and/or the metal oxide, the carbon material and the metal and/or the metal oxide may form a complex. Hereinafter, as an example, a complex comprising silicon, a silicon oxide and a carbon material (hereinafter also referred to as Si/SiO/C complex) will be described but the metal and the metal oxide are not limited to silicon and silicon oxide.

In one embodiment, the Si/SiO/C complex may be a mixture of silicon, silicon oxide and a carbon material, and can be prepared by mixing silicon, silicon oxide and a carbon material all in the form of particles by using a mechanical milling.

In one embodiment, the Si/SiO/C complex may be a complex in which the surfaces of particles of the silicon and the silicon oxide are coated with the carbon material. Examples of the coating method include chemical vapor deposition (CVD) of the particles in an organic gas and/or vapor. For example, such a complex may has a structure in which the surfaces of silicon oxide particles containing silicon are coated with carbon and the silicon is present in the form of nanoclusters in the silicon oxide.

From the viewpoint of the adhesion of the polyacrylic acid which is mentioned later, it is more preferable in some cases that the surfaces of the metal and/or the metal oxide are not coated with the carbon material.

The negative electrode according to the present embodiment comprises at least one selected from the group consisting of the metals and the metal oxides. The content of the metal and/or the metal oxide is not particularly limited but the total content of the metal and the metal oxide is preferably 0.5% by mass or more and 30% by mass or less, more preferably 1% by mass or more and 20% by mass or less in the negative electrode active material. When the metal and/or the metal oxide are complexed with the carbon material, said total content of the metal and the metal oxide does not include the mass of the complexed carbon material. By setting the content of the metal and the metal oxide within said range, a high capacity negative electrode can be obtained and the deterioration of cycle characteristics due to volume change of active materials upon the charge/discharge can be more suppressed. When the negative electrode active material comprises both of the metal and the metal oxide, the content of the metal is preferably 0.5% by mass or more and 90% by mass or less, more preferably 1% by mass or more and 20% by mass or less, based on the total of the metal and the metal oxide.

The shape of the carbon material, metal, and metal oxide is not particularly limited but for example, particulate materials thereof can be used. The median particle size of the negative electrode active material is preferably 0.01 to 50 μm, and more preferably 0.02 to 40 μm. When the median particle size is within the range, it is possible to more suppress elution of constituent elements of the active material and to perform intercalation and deintercalation of lithium ions more smoothly. The median particle size ($D_{50}$) can be measured with a laser diffraction dispersion type particle size distribution (volume particle size distribution) measuring apparatus. In the embodiments comprising silicon and silicon oxide, it is also preferable that the median particle size of the silicon is smaller than the median particle size of the carbon material and the median particle size of the silicon oxide. In this manner, the silicon which changes largely in the volume upon the charge/discharge cycle has a relatively smaller particle size, and the carbon material and the silicon oxide, which changes a little in the volume, have relatively larger particle sizes. Therefore, generation of dendrite and particle size reduction of alloys can be more effectively inhibited.

(Negative Electrode Binder)

The negative electrode according to the present embodiment is characterized in comprising a polyacrylic acid as a binder.

The polyacrylic acid according to the present embodiment comprises an (meth)acrylic acid monomer unit denoted by the following formula (1).

In the formula (1), $R_1$ represents a hydrogen atom or methyl group. In addition, the (meth)acrylic acid monomer unit denoted by the formula (1) may be a monovalent metal salt structure denoted by the following formula (1-1).

(In the formula (1-1), $R_1$ represents a hydrogen atom or methyl group and M represents a monovalent metal.)

The ratio of the (meth)acrylic acid monomer units (including the monovalent metal salt thereof) in the polyacrylic acid is preferably 50% by mole or more, more preferably 60% by mole or more, most preferably 80% by mole or more, and may be 100% by mole of the total monomer units constituting the polyacrylic acid. By setting the ratio of the (meth)acrylic acid monomer units within the above mentioned range, excellent adhesion and coatability can be obtained and the ratio of carboxyl group which is a group with high acidity becomes sufficient. As a result, the reactivity between the binder and the disulfonic acid ester is improved and a coating with lower resistance can be formed on the negative electrode.

Herein, the term, "(meth)acrylic acid" is a generic term for acrylic acid and methacrylic acid, and includes one or both of acrylic acid and methacrylic acid. It is preferable that the polyacrylic acid according to the present embodiment at least comprises an acrylic acid monomer unit. The ratio of the acrylic acid monomer units and the methacrylic acid monomer units is not particularly limited but acrylic acid/methacrylic acid (molar ratio) is preferably 100/0 to 30/70, and more preferably 100/0 to 50/50.

The polyacrylic acid according to the present embodiment may comprise a monomer unit denoted by the following formula (2) or monovalent metal salt structure thereof in addition to the (meth)acrylic acid monomer unit.

In the formula (2), $R_2$ represents sulfo group (—$SO_3H$) or phosphate group (—$OPO(OH)_2$). In addition, the monomer unit denoted by the formula (2) may be a monovalent metal salt structure.

Since these monomer units have a highly acidic group on a side chain, they can form a low resistance coating onto the negative electrode by the reaction with the disulfonic acid ester.

The monomer unit denoted by the formula (1) or (2) may include its monovalent metal salt structure at an arbitrary rate. Examples of the monovalent metal include alkali metals (such as Na, Li, K, Rb, Cs, and Fr) and monovalent noble metals (such as Ag, Au, and Cu). Among them, alkali metals are preferred, and Na, Li and K are more preferred. The metal salt of the phosphate group may be either a monovalent salt or divalent salt. By using the metal salt of the polyacrylic acid comprising a monovalent metal salt structure in at least a part, its adhesion to constituent materials of the active material layer can be more improved in some cases. The content of Na is preferably 5000 mass ppm or more of the polyacrylic acid. The content of K is preferably 1 mass ppm to 5 mass ppm of the polyacrylic acid.

In addition, the polyacrylic acid according to the present embodiment may comprise other monomer units than the monomer units represented by the formula (1) or (2) in such a range that the effect of the present invention is not impaired. Examples of such monomer unit, but are not particularly limited to, include monomer units derived from a monomer component such as carboxylic acids having an ethylenically unsaturated group, such as monocarboxylic acid compounds such as crotonic acid, and pentenoic acid, and dicarboxylic acid compounds such as itaconic acid and maleic acid; aromatic olefins having acidic group such as styrene sulfonic acid, and styrene carboxylic acid; (meth) acrylic acid alkyl esters; or acrylonitrile. Among them, it is especially preferred to comprise a monomer unit derived from a (meth)acrylic acid alkyl ester. The content of the monomer units derived from a (meth)acrylic acid alkyl ester is preferably 10 to 20% by mass of the polyacrylic acid. The content of the monomer units derived from an aromatic olefin is preferably 5% by mass or less of the polyacrylic acid. In addition, it may be a monomer unit constituting publicly known polymers used as a binder in secondary batteries. These monomer units may be a monovalent metal salt structure in at least a part.

In addition, at least one of hydrogens in main chains and side chains of the polyacrylic acid according to the present embodiment may be substituted with halogen (such as fluorine, chlorine, boron, iodine) and the like.

When the polyacrylic acid according to the present embodiment is a copolymer comprising two or more of monomer units, the copolymer may be any of random copolymer, alternating copolymer, block copolymer, graft copolymer, and combination thereof.

The molecular weight of the polyacrylic acid according to the present embodiment is not particularly limited but the mass average molecular weight is preferably 1000 or more, more preferably 10,000 to 5000,000 and most preferably 300,000 to 350,000. When the mass average molecular weight is within the above range, good dispersibility of active materials and conductive agents can be maintained and it is possible to suppress an excessive increase in slurry viscosity. The mass average molecular weight can be obtained from a molecular weight distribution curve determined versus a polystyrene standard by a conventional method using GPC.

In one embodiment, a crosslinked type polyacrylic acid can be used. The binding force is improved in some cases by using the crosslinked type polyacrylic acid. Examples of the crosslinked type polyacrylic acid include polyacrylic acids using a crosslinking agent forming crosslinks by an organic peroxide, heat and/or light, polyacrylic acids comprising crosslinkable groups (for example, epoxy group, N-methylolamide group, oxazoline group and the like) forming crosslinks by heat and/or light, and the like. Examples of the crosslinking agent and the crosslinkable group, but are not particularly limited to, include publicly known ones such as those described in WO2012/115252. A polyacrylic acid crosslinked in advance may be used and crosslinks may be formed in the manufacturing process of the electrode (during forming an active material layer). From the viewpoint of dispersibility of the active material, the conductive agent, and the binder, the content ratio of the monomer units comprising a crosslinked structure or a crosslinkable group is preferably 90% by mole or less, more preferably 50% by mole or less of the total monomer units constituting the polyacrylic acid. On the other hand, from the viewpoint of flexibility of the binder, it is preferred in some cases not to comprise a crosslinkable group which is condensed by heating.

The polyacrylic acid according to the present embodiment may be non-crosslinked type, crosslinked type, or mixture of the non-crosslinked type and the crosslinked type. From the viewpoint of cycle characteristics (capacity retention ratio), it is preferred to comprise the non-crosslinked type polyacrylic acid, and it is more preferred to comprise the non-crosslinked type polyacrylic acid as a main component of the polyacrylic acid (for example, in an amount of 50% by weight or more).

The manufacturing method of the polyacrylic acid according to the present embodiment is not limited but for example, it can be manufactured by polymerizing (meth) acrylic acid and optionally another monomer component. The polyacrylic acid having a monovalent metal salt structure can be manufactured, for example, by neutralizing monomer components before polymerization or polymers after polymerization with a hydroxide, carbonate, bicarbonate or the like of a monovalent metal. Publicly known methods may be accordingly adopted as the polymerization method, the polymerization condition, and the neutralization method.

From the viewpoint of "sufficient binding force" and "high energy density" that are in a trade-off relation with each other, the amount of the polyacrylic acid in the negative electrode is preferably 0.5 to 25 parts by mass, and more preferably 0.5 to 5 parts by mass based on 100 parts by mass of the negative electrode active material.

In addition, in one embodiment, it is also preferable that a binder other than the polyacrylic acid is used in combination. Examples of the binder other than the polyacrylic acid include polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide and polyamideimide. When these binders are used, they are preferably used in the range of 10 to 200 parts by mass based on 100 parts by mass of the polyacrylic acid according to the present embodiment.

(Negative Electrode Current Collector)

As the negative electrode current collector, aluminum, nickel, stainless, chromium, copper, silver, and alloys thereof are preferred because of electrochemical stability. Examples of its shape include foil, a flat plate shape, and a mesh shape.

(Manufacturing Method of Negative Electrode)

The negative electrode can be made by forming a negative electrode active material layer comprising the negative electrode active material and the negative electrode binder on the negative electrode current collector. Examples of the method for forming the negative electrode active material layer include a doctor blade method, a die coater method, a CVD method, and a sputtering method. It is possible to previously form a negative electrode active material layer and then form a thin film of aluminum, nickel, or an alloy thereof by a method such as vapor deposition or sputtering to provide a negative electrode.

[2] Positive Electrode

The positive electrode may have a structure in which a positive electrode active material layer containing a positive electrode active material and a positive electrode binder is formed on a positive electrode current collector.

(Positive Electrode Active Material)

The positive electrode active material according to the present embodiment is not particularly limited as long as it is a material capable of intercalating/deintercalating lithium but from the viewpoint of high energy density, it preferably comprises a compound with high capacity. Examples of the high capacity compound include lithium nickel composite oxides in which a part of Ni of lithium nickelate ($LiNiO_2$) is replaced by another metal element, and layered lithium nickel composite oxides represented by the following formula (3) are preferred.

$$Li_yNi_{(1-x)}M_xO_2 \quad (3)$$

wherein $0 \leq x < 1$, $0 < y \leq 1.2$, and M is at least one element selected from the group consisting of Co, Al, Mn, Fe, Ti, and B.

In addition, from the viewpoint of high capacity, it is preferred that the content of Ni is high, that is, x is less than 0.5, further preferably 0.4 or less in the formula (3). Examples of such compounds include $Li_\alpha Ni_\beta Co_\gamma Mn_\delta O_2$ ($0<\alpha \leq 1.2$, preferably $1 \leq \alpha \leq 1.2$, $\beta+\gamma+\delta=1$, $\beta \geq 0.7$, and $\gamma \leq 0.2$) and $Li_\alpha Ni_\beta Co_\gamma Al_\delta O_2$ ($0<\alpha \leq 1.2$, preferably $1 \leq \alpha \leq 1.2$, $\beta+\gamma+\delta=1$, $\beta \geq 0.7$, and $\gamma \leq 0.2$) and particularly include $LiNi_\beta Co_\gamma Mn_\delta O_2$ ($0.75 \leq \beta \leq 0.85$, $0.05 \leq \gamma \leq 0.15$, and $0.10 \leq \delta \leq 0.20$). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ may be preferably used.

From the viewpoint of thermal stability, it is also preferred that the content of Ni does not exceed 0.5, that is, x is 0.5 or more in the formula (3). In addition, it is also preferred that particular transition metals do not exceed half. Examples of such compounds include $Li_\alpha Ni_\beta Co_\gamma Mn_\delta O_2$ ($0<\alpha \leq 1.2$, preferably $1 \leq \alpha \leq 1.2$, $\beta+\gamma+\delta=1$, $0.2 \leq \beta \leq 0.5$, $0.1 \leq \gamma \leq 0.4$, and $0.1 \leq \delta \leq 0.4$). More specific examples may include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (also including those in which the content of each transition metal fluctuates by about 10% in these compounds).

In addition, two or more compounds represented by the formula (3) may be mixed and used, and, for example, it is also preferred that NCM532 or NCM523 and NCM433 are mixed in the range of 9:1 to 1:9 (as a typical example, 2:1) and used. Further, by mixing a material in which the content of Ni is high (x is 0.4 or less in the formula (3)) and a material in which the content of Ni does not exceed 0.5 (x is 0.5 or more, for example, NCM433), a battery having high capacity and high thermal stability can also be formed.

Examples of the positive electrode active materials other than the above include lithium manganate having a layered structure or a spinel structure such as $LiMnO_2$, $Li_xMn_2O_4$ ($0<x<2$), $Li_2MnO_3$, and $Li_xMn_{1.5}Ni_{0.5}O_4$ ($0<x<2$); $LiCoO_2$ or materials in which a part of the transition metal in this material is replaced by other metal(s); materials in which Li is excessive as compared with the stoichiometric composition in these lithium transition metal oxides; materials having olivine structure such as $LiFePO_4$, and the like. In addition, materials in which a part of elements in these metal oxides is substituted by Al, Fe, P, Ti, Si, Pb, Sn, In, Bi, Ag, Ba, Ca, Hg, Pd, Pt, Te, Zn, La are also usable. The positive electrode active materials described above may be used alone or in combination of two or more.

(Positive Electrode Binder)

Examples of the positive electrode binder, but are not particularly limited to, include polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide and polyamideimide. The above mentioned polyacrylic acid according to the present embodiment may be used. Among those, polyvinylidene fluoride or polytetrafluoroethylene is preferable from the viewpoint of versatility and low cost, and polyvinylidene fluoride is more preferable. The amount of the positive electrode binder is preferably 2 to 10 parts by mass based on 100 parts by mass of the positive electrode active material, from the viewpoint of "binding strength" and "energy density" that are in a trade-off relation with each other.

(Conductive Agent)

For the coating layer containing the positive electrode active material, a conductive agent may be added for the purpose of lowering the impedance. Examples of the conductive agent include flake-like, soot, and fibrous carbon fine particles and the like, for example, graphite, carbon black, acetylene black, vapor grown carbon fibers and the like.

(Positive Electrode Current Collector)

As the positive electrode current collector, the same material as the negative electrode current collector can be used. In particular, as the positive electrode, a current collector using aluminum, an aluminum alloy, or iron-nickel-chromium-molybdenum based stainless steel is preferable.

(Manufacturing Method of Positive Electrode)

The positive electrode can be manufactured by forming a positive electrode active material layer comprising the positive electrode active material and the positive electrode binder on the positive electrode current collector in the same manner as the negative electrode.

[3] Electrolyte Solution

The electrolyte solution according to the present embodiment comprises a supporting salt, a non-aqueous solvent and a disulfonic acid ester.

(Supporting Salt)

Examples of the supporting salt, but are not particularly limited to, include lithium salts such as $LiPF_6$, $LiAsF_6$, $LiAlCl_4$, $LiClO_4$, $LiBF_4$, $LiSbF_6$, $LiCF_3SO_3$, $LiC_4F_9SO_3$, $Li(CF_3SO_2)_2$, $LiN(CF_3SO_2)_2$, and the like. The supporting salts may be used in alone or in combination of two or more.

It is preferable that the concentration of the supporting salt in the electrolyte solution is 0.5 to 1.5 mol/l. It becomes easy to adjust the density, the viscosity, the conductivity, and the like in an appropriate range by making the concentration of the supporting salt within the above-described range.

(Non-Aqueous Solvent)

As the non-aqueous solvent, an aprotic solvent is preferred but the present invention is not limited to these. Examples of the non-aqueous solvent include carbonates such as cyclic carbonates and open-chain carbonates, aliphatic carboxylic acid esters, γ-lactones, cyclic ethers, open-chain ethers and fluorinated derivatives of these. These may be used singly or in combination of two or more thereof.

Examples of the cyclic carbonates include propylene carbonate (PC), ethylene carbonate (EC), butylene carbonate (BC) and vinylene carbonate (VC).

Examples of the open-chain carbonates include dimethyl carbonate (DMC), diethyl carbonate (DEC), ethyl methyl carbonate (EMC) and dipropyl carbonate (DPC).

Examples of the aliphatic carboxylic acid esters include methyl formate, methyl acetate and ethyl propionate.

Examples of the γ-lactones include γ-butyrolactone.

Examples of the cyclic ethers include tetrahydrofuran and 2-methyltetrahydrofuran.

Examples of the open-chain ethers include 1,2-diethoxyethane (DEE) and ethoxymethoxyethane (EME).

In addition, the following non-aqueous solvents are exemplified such as dimethyl sulfoxide, 1,3-dioxolane, formamide, acetamide, dimethylformamide, acetonitrile, propionitrile, nitromethane, ethyl monoglyme, phosphoric acid triester, trimethoxymethane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, N-methylpyrrolidone, fluorinated carboxylic acid ester, methyl-2,2,2-trifluoroethyl carbonate, methyl-2,2,3,3,3-pentafluoropropyl carbonate, trifluoromethyl ethylene carbonate, monofluoromethyl ethylene carbonate, difluoromethyl ethylene carbonate, 4,5-difluoro-1,3-dioxolan-2-one, monofluoroethylene carbonate. These may be used singly or in combinations of two or more thereof. Among those, monofluoromethyl ethylene carbonate is especially preferred. The content of monofluoromethyl ethylene carbonate in the electrolyte solution is preferably 5% by mass or more, and more preferably 10% by mass or more.

The non-aqueous solvent preferably comprises carbonates. The carbonates include cyclic carbonates or open-chain carbonates. Advantages of the carbonates are that the relative dielectric constant is large, and therefore the ion dissociation properties of the electrolytic solution improve, and further the viscosity of the electrolytic solution decreases, and therefore the ion mobility improves. On the other hand, when the electrolyte solution comprising carbonates is used, the carbonates decompose to generate a gas, and thereby battery performance decreases in some cases. However, since the decomposition of the carbonates can be suppressed in the present embodiment by using the electrolyte solution comprising the disulfonic acid esters, the gas generation can be decreased even if carbonates are used in the non-aqueous solvent, and therefore, a high performance secondary battery can be provided. The content of the carbonates in the electrolytic solution is, for example, preferably 30% by volume or more, more preferably 50% by volume or more, and still more preferably 70% by volume or more.

(Additive)

The electrolyte solution according to the present embodiment comprises sulfur type additives such as disulfonic acid esters. The disulfonic acid esters are decomposed to form a coating onto the negative electrode during the initial charge/discharge and can suppress decomposition of the electrolyte solution and the like. In addition, according to the present embodiment, a low resistance coating can be formed onto the negative electrode by the reaction between the disulfonic acid ester and the acidic group on a side chain of the polyacrylic acid that is a binder. Therefore, it is possible to realize good cycle characteristics even if the polyacrylic acid is used as a binder. As the disulfonic acid ester, compounds denoted by the formula (4) are preferred.

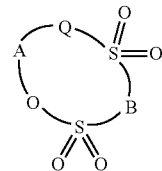

(4)

(In the formula (4),

Q represents an oxygen atom, methylene group, or a single bond;

A represents substituted or unsubstituted alkylene group having 1 to 5 carbon atoms, carbonyl group, sulfinyl group, substituted or unsubstituted fluoroalkylene group having 1 to 6 carbon atoms, or a group having 2 to 6 carbon atoms in which alkylene units or fluoroalkylene units are bonded through an ether bond; and B represents substituted or unsubstituted alkylene group that may be branched; substituted or unsubstituted fluoroalkylene group that may be branched; or an oxygen atom.)

In the formula (4), Q represents an oxygen atom, methylene group, or a single bond, and an oxygen atom (—O—) is preferred.

In the formula (4), A represents substituted or unsubstituted alkylene group having 1 to 5 carbon atoms; carbonyl group; sulfinyl group; substituted or unsubstituted fluoroalkylene group having 1 to 6 carbon atoms; or a group having 2 to 6 carbon atoms in which alkylene units or fluoroalkylene units are bonded through an ether bond. In the formula (4), when A represents alkylene group, it may be either straight or branched, and is preferably straight. In the case of a straight alkylene group, the alkylene group is represented by —(CH$_2$)$_n$— (n is an integer of 1 to 5), is more preferably a methylene group or an ethylene group represented by —(CH$_2$)$_n$— (n is 1 or 2), and is furthermore preferably a methylene group. In the branched alkylene group, at least one hydrogen atom of the alkylene group represented by —(CH$_2$)$_n$— (n is an integer of 1 to 4) is substituted with an alkyl group; examples of the branched alkylene group include —C(CH$_3$)$_2$—, —C(CH$_3$)(CH$_2$CH$_3$)—, —C(CH$_2$CH$_3$)$_2$—, —CH(C$_m$H$_{2m+1}$)— (m is an integer of 1 to 4), —CH$_2$—C(CH$_3$)$_2$—, —CH$_2$—CH(CH$_3$)—, —CH(CH$_3$)—CH(CH$_3$)—, —CH(CH$_3$)CH$_2$CH$_2$— or —CH(CH$_3$)CH$_2$CH$_2$CH$_2$—. The fluoroalkylene group means a group in which at least one of the hydrogen atoms in each of the foregoing alkylene groups is substituted with a fluorine atom. All the hydrogen atoms may be substituted with fluorine atoms. The position and the number of the fluorine substitution are arbitrary. The fluoroalkylene group may either be straight or branched, and is preferably straight. When all the hydrogen atoms are substituted with fluorine atoms in the straight fluoroalkylene group, A is represented by —(CF$_2$)$_n$— (n is an integer of 1 to 5). Specifically, examples of the fluoroalkylene group include monofluoromethylene group, difluoromethylene group, monofluoroethylene group, difluoroethylene group, trifluoroethylene group and tetrafluoroethylene group.

Examples of "a divalent group having 2 to 6 carbon atoms in which alkylene units or fluoroalkylene units are bonded through an ether bond" in A include —$R_1$—O—$R_2$— ($R_1$ and $R_2$ each independently represent an alkylene group or a fluoroalkylene group, and the total number of carbon atoms of $R_1$ and $R_2$ is 2 to 6), and —$R_3$—O—$R_4$—O—$R_5$— ($R_3$, $R_4$ and $R_5$ each independently represent an alkylene group or a fluoroalkylene group, and the total number of carbon atoms of $R_3$, $R_4$ and $R_5$ is 3 to 6). $R_1$ and $R_2$ may both be alkylene groups or fluoroalkylene groups, or one of $R_1$ and $R_2$ may be an alkylene group and the other may be a fluoroalkylene group. $R_3$, $R_4$ and $R_5$ may each independently be an alkylene group or a fluoroalkylene group. Examples thereof include —$CH_2$—O—$CH_2$—, —$CH_2$—O—$C_2H_4$—, —$C_2H_4$—O—$C_2H_4$—, —$CH_2$—O—$CH_2$—O—$CH_2$—, —$CH_2$—O—CHF—, —$CH_2$—O—$CF_2$—, —$CF_2$—O—$CF_2$—, —$C_2F_4$—O—$C_2F_4$—, —$CF_2$—O—$CF_2$—O—$CF_2$—, —$CH_2$—O—$CF_2$—O—$CH_2$—.

In the formula (4), B represents substituted or unsubstituted alkylene group that may be branched; substituted or unsubstituted fluoroalkylene group that may be branched; or an oxygen atom. The number of carbon atoms of the alkylene group is preferably 1 to 5 and the number of carbon atoms of the fluoroalkylene group is preferably 1 to 6. As the alkylene group and the fluoroalkylene group, the groups described as the above A may be exemplified. Among those, B is preferably a methylene group (—$CH_2$—) or —CH($C_mH_{2m+1}$)— (m is an integer of 1 to 4), more preferably a methylene group, ethylidene group [—CH($CH_3$)—] or —CH($C_2H_5$)—, further preferably —CH($CH_3$)— or a methylene group.

The sulfonic acid ester denoted by the formula (4) is preferably a six-membered ring or a seven-membered ring, and examples of such a compound include methylene methanedisulfonic acid ester (MMDS) in which, A and B are each methylene group, and Q is an oxygen atom in the formula (4); ethylene methanedisulfonic acid ester (EMDS) in which A is ethylene group, B is methylene group, and Q is an oxygen atom; and 3-methyl-1,5,2,4-dioxadithiane-2,2,4,4-tetraoxide (3MDT) in which A is methylene group, B is ethylidene group [—CH($CH_3$)—], and Q is an oxygen atom. One of the sulfonic acid ester denoted by the formula (4) may be used alone, or two or more thereof may be used in combination.

The content of the compound denoted by the formula (4) in the electrolyte solution is not particularly limited but it is preferably 0.005 to 10% by weight of the whole electrolyte solution. When the content of the compound denoted by the formula (4) is 0.005% by weight or more, a sufficient film effect can be obtained. More preferably, it is added in an amount of 0.01% by weight or more, and thereby, battery performance may be further improved. When the content is 10% by weight or less, an increase in the viscosity of the electrolyte solution and an increase in resistance associated therewith can be suppressed. More preferably, it is added in an amount of 5% by weight or less, and thereby, battery performance is further improved.

In addition, in the present embodiment, the electrolyte solution may comprise other additives than the above mentioned compounds as necessary. Examples of such an additive include film forming additives except for the disulfonic acid esters, overcharging inhibitors, surfactants, and the like.

[4] Separator

As the separator, a porous film or non-woven fabric made of polypropylene, polyethylene, aramid or the like may be used, but the present invention is not particularly limited to these. In addition, the separator in which they are laminated may be used.

[5] Outer Package

The outer package is not particularly limited but, for example, a laminate film may be used. For example, in the case of a stacked laminate type secondary battery, a laminate film made of polypropylene, polyethylene, or the like, coated with aluminum or silica, may be used. As the porous separator 5, porous films made of polyolefins such as polypropylene and polyethylene, fluororesins, and the like are used. As the outer package, any outer package can be appropriately selected as long as it is stable against the electrolyte solution and has a sufficient water vapor barrier property. For example, in the case of a layered laminate type secondary battery, a laminate film such as polypropylene and polyethylene coated with aluminum or silica can be used as the outer package.

[6] Secondary Battery

For example, the secondary battery using non-aqueous electrolyte solution according to the present embodiment has a structure as shown in FIG. 1. In the positive electrode, a layer 1 comprising a positive electrode active material is formed on a positive electrode current collector 3. In the negative electrode, a layer 2 comprising a negative electrode active material is formed on a negative electrode current collector 4. These positive electrode and negative electrode are disposed so as to face each other with a porous separator 5 between them. The porous separator 5 is disposed generally parallel to the layer 2 comprising a negative electrode active material. An electrode element where these positive electrode and negative electrode are disposed so as to face each other and the electrolyte solution are enclosed in packages 6 and 7 in the secondary battery. A positive electrode tab 9 is connected to the positive electrode current collector 3, a negative electrode tab 8 is connected to the negative electrode current collector 4, and these tabs are drawn out on the package. The electrode element may have a structure in which a plurality of positive electrodes and a plurality of negative electrodes are laminated through a separator. Shape of the non-aqueous electrolyte secondary battery according to the present embodiment is not particularly limited, but examples of the shape include a laminate packaging type, a cylindrical type, a prismatic type, a coin type and the like. In addition, a plurality of the secondary batteries according to the present embodiment may be connected in series and/or in parallel, to prepare an assembled battery.

Figure 2:
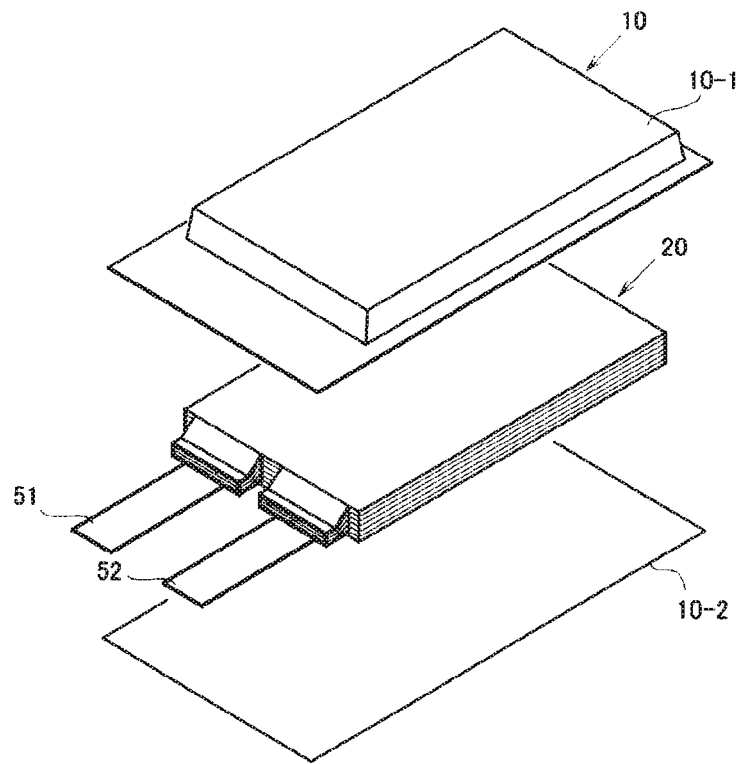
FIG. 2 is an exploded perspective view showing a basic structure of a film package battery.
Figure 3:
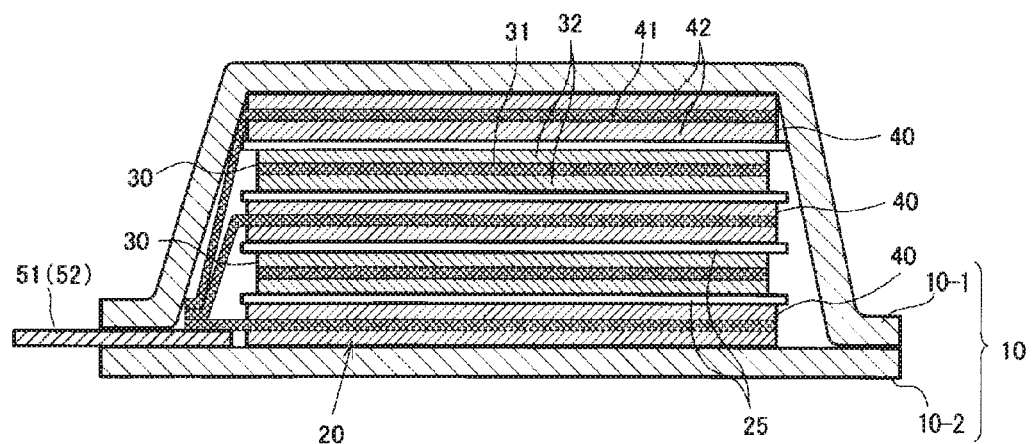
FIG. 3 is a cross-sectional view schematically showing a cross section of the battery of FIG. 2.

In further another embodiment, a secondary battery having a structure as shown in FIG. 2 and FIG. 3 may be provided. This secondary battery comprises a battery element 20, a film package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 3. In the positive electrode 30, an electrode material 32 is applied to both surfaces of a metal foil 31, and also in the negative electrode 40, an electrode material 42 is applied to both surfaces of a metal foil 41 in the same manner.

In the secondary battery in FIG. 1, the electrode tabs are drawn out on both sides of the package, but a secondary battery to which the present invention may be applied may have an arrangement in which the electrode tabs are drawn out on one side of the package as shown in FIG. 2. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 3). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 3, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 2 and FIG. 3, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

An example of methods for manufacturing the secondary battery will be described. In a dry air or inert gas atmosphere, a negative electrode and a positive electrode are laminated through the intermediary of the porous separator and optionally, such a laminate is winded. Subsequently, the laminate is housed in a battery can or an outer package formed of a flexible film made of a laminate composed of a synthetic resin and a metal foil, and impregnated with a non-aqueous electrolyte solution. And then, a good coating can be formed onto the negative electrode by charging the secondary battery before or after sealing the outer package.

[7] Vehicle

The lithium ion secondary battery according to the present embodiment can be used in vehicles. Vehicles according to the present embodiment include hybrid vehicles, fuel cell vehicles, electric vehicles (besides four-wheel vehicles (cars, trucks, commercial vehicles such as buses, light automobiles, etc.) two-wheeled vehicle (bike) and tricycle), and the like. These vehicles are highly safe because they comprise the secondary battery according to the present embodiment. The vehicles according to the present embodiment is not limited to automobiles, it may be a variety of power source of other vehicles, such as a moving body like a train.

[6] Power Storage Equipment

The secondary battery according to the present embodiment can be used in power storage system. The power storage systems according to the present embodiment include, for example, those which is connected between the commercial power supply and loads of household appliances and used as a backup power source or an auxiliary power in the event of power outage or the like, or those used as a large scale power storage that stabilize power output with large time variation supplied by renewable energy, for example, solar power generation.

EXAMPLE

Specific examples according to the present invention will be described below, but the present invention is not limited to these examples.

Example 1

(Preparation of Electrode)
<Negative Electrode>

Graphite and an alloy of Si and Ti were used as a negative electrode active material. This negative electrode active material, acetylene black as a conductive agent, and a non-crosslinked type copolymer of acrylic acid and sodium acrylate having a mass average molecular weight of 330,000 as a negative electrode binder were weighed at a mass ratio of 90:7:3. Then, they were mixed with water to prepare a negative electrode slurry. The negative electrode slurry was applied on copper foil having a thickness of 10 μm, and then dried and further heat-treated at 100° C. under vacuum, to manufacture a negative electrode.

<Positive Electrode>

$Li(Ni_{0.8}Co_{0.15}Al_{0.05})O_2$ was used as a positive electrode active material. This positive electrode active material, carbonblack as a conductive agent, and polyvinylidene fluoride as a positive electrode binder were weighed at a mass ratio of 90:5:5. Then, they were mixed with N-methyl pyrrolidone to prepare a positive electrode slurry. The positive electrode slurry was applied onto aluminum foil having a thickness of 20 μm, and then dried and further pressed to manufacture a positive electrode.

<Electrode Stack>

Three layers of the positive electrode and four layers of the negative electrode thus obtained were alternately stacked, with aramid porous films used as separator sandwiched therebetween. The end portions of the positive electrode collectors not covered with the positive electrode active material and the end portions of the negative electrode collectors not covered with the negative electrode active material were respectively welded, and a positive electrode terminal made of aluminum and a negative electrode terminal made of nickel were welded to the respective welded portions to obtain an electrode stack having a planar laminate structure.

<Electrolyte Solution>

A mixed solvent of ethylene carbonate (EC) and diethyl carbonate (DEC) (volume ratio: EC/DEC=30/70) was used as a solvent of a non-aqueous electrolyte solution. $LiPF_6$ was dissolved as a supporting salt at 1M in the non-aqueous electrolyte solution.

Methylene methanedisulfonic acid ester (MMDS) denoted by the formula (1) in which A and B are methylene group and Q is an oxygen atom, as additive, were added in an amount of 1.6% by weight in the non-aqueous electrolyte solution to prepare the non-aqueous electrolyte solution.

<Secondary Battery>

The electrode stack was housed in an aluminum laminate film as a package, and the electrolyte solution was injected into the package. Then, while the pressure was reduced to 0.1 atm, the package was sealed to fabricate a secondary battery.

<Evaluation>

(Capacity Retention Ratio at 45° C.)

The fabricated secondary battery was subjected to a test in which charge and discharge was repeated 50 times in the voltage range of 2.5 V to 4.2 V in a thermostat kept at 45° C., and evaluated for the cycle retention ratio (capacity retention ratio) (%). In the charge, the secondary battery was charged at 1 C to 4.2 V and then subjected to constant voltage charge for 2.5 hours in total. In the discharge, the secondary battery was subjected to constant current discharge at 1 C to 2.5 V.

The "capacity retention ratio (%)" was calculated by (discharge capacity after 50 cycles)/(discharge capacity after 1 cycle)×100 (unit: %). The result is shown in Table 1.

Comparative Example 1

A mixed solvent of EC and DEC (volume ratio: 30/70) was used as a solvent of a non-aqueous electrolyte solution. The additive was not added and $LiPF_6$ was dissolved as a supporting salt. A secondary battery was fabricated and a charge and discharge cycle test was performed 50 times in the same manner as in Example 1. The results are shown in Table 1.

Example 2

A secondary battery was fabricated and a charge and discharge cycle test was performed 50 times in the same manner as in Example 1 except that a copolymer of acrylonitrile and acrylic acid having a mass average molecular weight of 330,000 was used as a negative electrode binder. The results are shown in Table 1.

Comparative Example 2

A mixed solvent of EC and DEC (volume ratio: 30/70) was used as a solvent of a non-aqueous electrolyte solution. The additive was not added and $LiPF_6$ was dissolved as a supporting salt. A secondary battery was fabricated and a charge and discharge cycle test was performed 50 times in the same manner as in Example 2. The results are shown in Table 1.

Comparative Example 3

A secondary battery was fabricated and a charge and discharge cycle test was performed 50 times in the same manner as in Example 1 except that SBR was used as a negative electrode binder in an amount of 3% by mass and CMC was used as a thickener in an amount of 1% by mass, based on the total amount of the active material, the binder and the thickener. The results are shown in Table 1.

Comparative Example 4

A mixed solvent of EC and DEC (volume ratio: 30/70) was used as a solvent of a non-aqueous electrolyte solution. The additive was not added and $LiPF_6$ was dissolved as a supporting salt. A secondary battery was fabricated and a charge and discharge cycle test was performed 50 times in the same manner as in Comparative example 3. The results are shown in Table 1.

Example 3

A secondary battery was fabricated and a charge and discharge cycle test was performed 50 times in the same manner as in Example 1 except that a copolymer of acrylic acid, sodium acrylate and methyl acrylate having a mass average molecular weight of 330,000 was used as a negative electrode binder. The results are shown in Table 1.

Example 4

A secondary battery was fabricated and a charge and discharge cycle test was performed 50 times in the same manner as in Example 1 except that a copolymer of acrylic acid, sodium acrylate and methyl acrylate having a mass average molecular weight of 100,000 was used as a negative electrode binder. The results are shown in Table 1.

TABLE 1

| | Binder | Mass average molecular weight | Electrolyte solution additive | Capacity retention ratio at $50^{th}$ cycle (%) |
| --- | --- | --- | --- | --- |
| Example 1 | Copolymer of acrylic acid and sodium acrylate | 330,000 | MMDS | 90 |
| Comparative example 1 | Copolymer of acrylic acid and sodium acrylate | 330,000 | None | 70 |
| Example 2 | Copolymer of acrylonitrile and acrylic acid | 330,000 | MMDS | 82 |
| Comparative example 2 | Copolymer of acrylonitrile and acrylic acid | 330,000 | None | 67 |
| Comparative example 3 | SBR | | MMDS | 69 |
| Comparative example 4 | SBR | | None | 63 |
| Example 3 | Copolymer of acrylic acid, sodium acrylate and methyl acrylate | 330,000 | MMDS | 93 |
| Example 4 | Copolymer of acrylic acid, sodium acrylate and methyl acrylate | 100,000 | MMDS | 87 |

INDUSTRIAL APPLICABILITY

The battery according to the present invention can be utilized in, for example, all the industrial fields requiring a power supply and the industrial fields pertaining to the transportation, storage and supply of electric energy. Specifically, it can be used in, for example, power supplies for mobile equipment such as cellular phones and notebook personal computers; power supplies for electrically driven vehicles including an electric vehicle, a hybrid vehicle, an electric motorbike and an electric-assisted bike, and moving/ transporting media such as trains, satellites and submarines; backup power supplies for UPSs; and electricity storage facilities for storing electric power generated by photovoltaic power generation, wind power generation and the like.

EXPLANATION OF REFERENCE 1 positive electrode active material layer
2 negative electrode active material layer
3 positive electrode current collector
4 negative electrode current collector
5 porous separator
6 laminate outer package
7 laminate outer package
8 negative electrode tab
9 positive electrode tab
10 film package
20 battery element
25 separator
30 positive electrode
40 negative electrode

The invention claimed is:

1. A lithium ion secondary battery comprising a positive electrode, a negative electrode, and an electrolyte solution, wherein
the negative electrode comprises:
(a) a carbon material that can absorb and desorb lithium ions;
(b) at least one selected from the group consisting of Si, an alloy comprising Si, and a silicon oxide; and
a polyacrylic acid,
the electrolyte solution consists of a solvent, an additive, and a supporting salt, wherein the additive consists of a disulfonic acid ester(s), and
the positive electrode comprises a layered lithium nickel composite oxide represented by the following formula (3):

$$Li_yNi_{(1-x)}M_xO_2 \quad (3)$$

wherein 0≤x<1, 0<y≤1.2, and M is at least one element selected from the group consisting of Co, Al, Mn, Fe, Ti, and B.

2. The lithium ion secondary battery according to claim 1, wherein the polyacrylic acid comprises at least one selected from the group consisting of (meth)acrylic acid monomer units denoted by the following formula (1) and monovalent metal salt structures thereof,

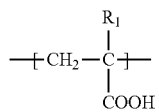
(1)

wherein $R_1$ is a hydrogen atom or a methyl group.

3. The lithium ion secondary battery according to claim 2, wherein a total ratio of the (meth)acrylic acid monomer units denoted by the formula (1) and the monovalent metal salt structures thereof is 50% by mole or more of all of monomer units of the polyacrylic acid.

4. The lithium ion secondary battery according to claim 3, wherein the total ratio of the (meth)acrylic acid monomer units denoted by the formula (1) and the monovalent metal salt structures thereof is 80% by mole or more of all of monomer units of the polyacrylic acid.

5. The lithium ion secondary battery according to claim 1, wherein the polyacrylic acid comprises a monomer unit denoted by the following formula (1-1),

(1-1)

wherein $R_1$ is a hydrogen atom or methyl group, and M represents a monovalent metal.

6. The lithium ion secondary battery according to claim 5, wherein M of the formula (1-1) is Na.

7. The lithium ion secondary battery according to claim 1, wherein the polyacrylic acid has a mass average molecular weight of 300,000 to 350,000.

8. The lithium ion secondary battery according to claim 1, wherein the negative electrode comprises at least one selected from the group consisting of Si and $SiO_x$ (0<x≤2).

9. The lithium ion secondary battery according to claim 1, wherein the electrolyte solution comprises a disulfonic acid ester denoted by the following formula (4),

(4)

wherein
Q represents an oxygen atom, methylene group, or single bond,
A represents substituted or unsubstituted alkylene group having 1 to 5 carbon atoms, carbonyl group, sulfinyl group, substituted or unsubstituted fluoroalkylene group having 1 to 6 carbon atoms, or a group having 2 to 6 carbon atoms in which alkylene units or fluoroalkylene units are bonded through an ether bond, and
B represents substituted or unsubstituted alkylene group that may be branched, substituted or unsubstituted fluoroalkylene group that may be branched, or an oxygen atom.

10. An electrically driven vehicle equipped with the lithium ion secondary battery according to claim 1.

11. The lithium ion secondary battery according to claim 1, wherein the solvent includes a non-aqueous solvent selected from the group consisting of carbonates, aliphatic carboxylic acid esters, γ-lactones, cyclic ethers, open-chain ethers and fluorinated derivatives of these.

12. The lithium ion secondary battery according to claim 1, wherein the solvent includes a non-aqueous solvent selected from the group consisting of carbonates, aliphatic carboxylic acid esters, γ-lactones, cyclic ethers, and fluorinated derivatives of these.

13. The lithium ion secondary battery according to claim 1, wherein the polyacrylic acid comprises a monomer unit derived from a (meth)acrylic acid, a monomer unit derived from a (meth)acrylic acid metal salt, and a monomer unit derived from a (meth)acrylic acid alkyl ester.

14. The lithium ion secondary battery according to claim 1, wherein the polyacrylic acid comprises a monomer unit derived from a (meth)acrylic acid, a monomer unit derived from an acrylonitrile.

15. The lithium ion secondary battery according to claim 1, wherein the solvent includes one or more carbonate in an amount of 70% by volume or more, and the disulfonic acid ester includes methylene methanedisulfonic acid ester in an amount of 0.01 to 5% by weight or more.

16. A method for manufacturing a lithium ion secondary battery comprising a positive electrode, a negative electrode, and an electrolyte solution, comprising:
   a step of preparing an electrode element comprising the positive electrode and the negative electrode, and
   a step of encapsulating the electrode element and the electrolyte solution in an outer package, wherein the negative electrode comprises:
   (a) a carbon material that can absorb and desorb lithium ions;
   (b) at least one selected from the group consisting of Si, an alloy comprising Si, and a silicon oxide; and
   a polyacrylic acid,
the electrolyte solution consists of a solvent, an additive, and a supporting salt, wherein the additive consists of a disulfonic acid ester(s), and
the positive electrode comprises a layered lithium nickel composite oxide represented by the following formula (3):

$$Li_yNi_{(1-x)}M_xO_2 \tag{3}$$

wherein 0≤x<1, 0<y≤1.2, and M is at least one element selected from the group consisting of Co, Al, Mn, Fe, Ti, and B.

* * * * *